(12) United States Patent
Borza

(10) Patent No.: US 6,386,036 B1
(45) Date of Patent: May 14, 2002

(54) PRODDER WITH FORCE FEEDBACK

(75) Inventor: Michael A Borza, Ottawa (CA)

(73) Assignee: DEW Engineering and Development Limited, Ottawa (CA)

( * ) Notice: Subject to any disclaimer, the term of this patent is extended or adjusted under 35 U.S.C. 154(b) by 0 days.

(21) Appl. No.: 09/503,492

(22) Filed: Feb. 14, 2000

(30) Foreign Application Priority Data

Dec. 3, 1999 (CA) .......................................... 2291544

(51) Int. Cl.⁷ .............................................. G01H 15/00
(52) U.S. Cl. ............................. 73/574; 73/661; 367/87
(58) Field of Search ......................... 73/574, 629, 644, 73/661, 862.581, 862.584, 714; 367/87

(56) References Cited

U.S. PATENT DOCUMENTS

| | | | |
|---|---|---|---|
| 2,680,967 A | * 6/1954 | Newman | 73/862.581 |
| 2,833,143 A | * 5/1958 | Wales | 73/574 |
| 5,452,268 A | 9/1995 | Bernstein | 367/181 |
| 5,570,428 A | 10/1996 | Madaffari et al. | 381/191 |
| 5,672,825 A | 9/1997 | Uno et al. | 73/579 |
| 5,802,198 A | 9/1998 | Beavers et al. | 381/344 |
| 6,109,112 A | * 8/2000 | Borza et al. | 73/661 |

* cited by examiner

Primary Examiner—John E. Chapman
(74) Attorney, Agent, or Firm—Freedman & Associates

(57) ABSTRACT

A prodder with force feedback for detecting an object buried beneath the ground is disclosed. A probe is provided including a rod having a prodding end for prodding the object, there is also a transducer coupled to a non-prodding end of the rod for providing an acoustic wave to the object and for receiving acoustic waves reflected from the object. The housing has a first cavity containing a fluid and for supporting the probe such that the volume of the fluid within the first cavity is affected by the pressure applied to the prodding end of the rod. A force sensor is fluidly coupled to the first cavity for determining the change in pressure of a fluid within the first cavity. An electronics module is processing data related to the reflected waves, and to the change in the pressure of the fluid, and is providing data in order to compare the processed data with the stored value representing the characteristics of known materials.

16 Claims, 9 Drawing Sheets

Electret Microphone

PRODDER WITH FORCE FEEDBACK

FIELD OF THE INVENTION

This invention relates generally to prodders for probing the ground for buried explosive devices such as landmines and the like, and more particularly to a method and device for providing force feedback to the prodder and/or the user of the device.

BACKGROUND OF THE INVENTION

Despite a variety of mechanized means now available for detecting and clearing landmines, the current hand tool of choice is the hand prodder. Personnel exhibit greater confidence when traversing a minefield that has been hand-prodded by their compatriots than they do with fields cleared by other means.

The traditional hand prodder typically comprises a 30 cm long pointed rod extending from a gripping handle. The probe is generally non-magnetic to avoid setting off magnetically-triggered mines. The user probes the ground ahead and excavates any hard objects which the probe contacts. As the ratio of rocks to landmines in a minefield may number 1000:1, excavation of every contact is labourious, but very necessary.

Currently, instrumented prodders are known having ultrasonic means in the form of an ultrasonic transducer at or near the probe tip that are used for characterization of buried obstructions. These devices can be used in conjunction with a minimum metal content (MMC) detector, wherein the MMC detector first detects the ground indicating the vicinity of a land mine, and, wherein the instrumented prodder is used to probe the earth in the vicinity of the suspected land mine, the location of which may have been isolated using the MMC detector. MMC mine detectors having a search head and circuitry for detecting buried non-metallic and metallic land mines are well known. For example, U.S. Pat. No. 4,016,486 in the name of Pecori assigned to the United States of America by the Secretary of the Army, hereby incorporated by reference, discloses such circuitry.

U.S. Pat. No. 5,754,494 to Gallagher, hereby incorporated by reference, discloses an instrumented prodder having a probe in the form of an elongate, preferably non-magnetic rod including a gripping handle disposed at one end. The design of the probe is based partially upon a Split Hopkinson Pressure Bar (SHPB) apparatus. In the apparatus, a compression wave or high frequency elastic mechanical pulse is delivered via a rod to a sample, wherein a portion of the wave is reflected. The incident wave launched at the sample is reflected and/or transmitted from or through the sample, respectively, in dependence upon the characteristics of the material. The effect of mechanical impedance, which is a characteristic of a material, on a SHPB apparatus in three instances is described hereafter:

Firstly and obviously, if the mechanical impedance of a sample under test is the same as that of an incident bar in the SHPB, there will be no reflection as the sample will be displaced in a same manner as the bar itself as the compression wave is delivered. The displacement of the end of the bar is directly proportional to the strain measured ($\epsilon$).

Secondly when the mechanical impedance of a sample is considerably greater than that of the bar, a sample's mechanical impedance tends toward being infinite and substantially the entire wave is reflected.

In a third instance when the mechanical impedance is zero, in the absence of a sample, the reflected wave is tensile but of equal magnitude to the incident wave. The phase of the wave is shifted by $\pi$ and the net stress is zero; the relative displacement at the bar end equals twice that for the first instance ($2\epsilon$).

In a SHPB device, once the relative displacement of the bars is known, the displacement of the sample is ascertained. Taking into account Young's Modulus (E) and the displacement of the bar, the imposed stress can be calculated, wherein the force applied is equal to the product of the stress and the cross-sectional area of the bar.

Since the loading on the sample becomes equal after a short time, the analysis may be somewhat simplified. Strain results may be used for only the incident bar; or alternatively, the striker bar may be directed to impact directly on the sample, and the transmitter bar alone may be used to define the sample characteristics.

It is has been found that plastics, minerals and metals may be discerned from one another by using this approach.

It has been further found that the hand held prodder disclosed by Gallagher having a rod modified to be analogous to the incident bar of a SHPB may be used to detect or discern metal, plastic and rocks.

The prodder rod is provided with one or more piezoelectric transducers capable of generating an acoustic wave into the rod and for detecting reflected waves from an object contacting the end of the rod. Conveniently, signal processing means are coupled to the transducers and are provided for analysing the detected reflected waves for determining the characteristics of the object; more especially, for distinguishing landmines from inert rocks. The signal processor establishes measurements of the frequency-time-amplitude characteristic of the object. The reflected waves are compared with known characteristic signatures of a plurality of materials to attempt to ascertain a match within predetermined limits.

Although U.S. Pat. No. 5,754,494 describes a device that performs satisfactorily in many instances, it suffers from a problem related to the fact that acoustic coupling at the obstruction is a function of the force applied to the probe end. As a result, the results are often erroneous. This is particularly detrimental.

Furthermore, it is desired that enough force will be applied to the probe end such that characterisation of the obstruction can occur without causing detonation; and, preferably, a relatively consistent force will be applied to the probe end such that an accurate determination as to the character of the buried obstruction can be made. However if too little force is applied at the probe end, a poor reading may result and a mine in the vicinity of the probe may go undetected. Too much force applied at the probe end in the vicinity of a land mine may inadvertently detonate the mine.

It is therefore an object of the invention to provide a method and device, which will overcome the aforementioned problems, related to too much force, too little force, or a varying force being applied to the probe end while in use.

It is a further object of the invention to provide an instrumented prodder for detection of land mines and the like that includes force feedback for sensing a force, such as pressure, applied to an end thereof.

It is another object of the invention to provide an instrumented prodder for detection of land mines and the like, that provides data related to characteristics of the probed object that are independent from the force of the prodder on the object.

It is a further object of the invention to provide a hand-held prodder for probing the ground for buried explosive devices such as landmines and the like, that is relatively simple, rugged, and inexpensive.

SUMMARY OF THE INVENTION

Accordingly, there is provided a detector for detecting detonatable devices or land mines, comprising:

a probe having an end for placing in contact with an object beneath the surface of the ground, the probe for providing an indication of the presence of a metal or plastic material; and;

a sensor for detecting a pressure of a fluid within the detector, the pressure related to a force at the end of the probe when the end is placed in contact with the object.

According to another embodiment, there is provided a prodder with force feedback for sensing an object buried beneath the ground, comprising:

a probe including a rod having a prodding end for prodding the object and a transducer coupled to a non-prodding end of the rod for providing an acoustic wave to the object and for receiving acoustic waves reflected from the object;

a housing including a first cavity containing a fluid and for supporting the probe such that the volume of the fluid within the first cavity is affected by pressure applied to the prodding end of the rod;

a force sensor fluidly coupled to the first cavity for determining a change in pressure of a fluid within the first cavity; and, an electronics module for processing data related to the reflected waves, for processing data related the change in pressure of the fluid, and for providing data for comparing the processed data against stored values representative of the acoustic characteristics of known materials so as to categorize the object's material.

According to yet another embodiment, there is provided a land mine detector having force feedback comprising:

a probe including a rod having a driving end and a sensing end for prodding an object buried beneath the ground, the driving end coupled to a transducer for imparting mechanical energy into the rod towards the sensing end in contact with the object and for detecting an electrical signal corresponding to reflected waves reflected from the object;

a housing including a first cavity containing a fluid and for supporting the probe such that the volume of the fluid within the first cavity is affected by pressure applied to the prodding end of the rod;

a force sensor fluidly coupled to the first cavity for determining a change in pressure of a fluid within the first and for providing an electrical signal indicative thereof; and, an electronics module for processing the electrical signals, for determining the force exerted on the rod, and for determining force-independent material characteristics of the buried object for comparing with stored material characteristics of known objects so as to categorize the object's material.

Preferably, the force sensor comprises:

a body having a cavity, a sealed end, and an open end;

a diaphragm secured to the open end for retaining a fluid within the cavity and for sustaining deflections in dependence upon a pressure fluctuation of a fluid external the cavity; and, sensing means coupled to the diaphragm for measuring the deflections and for providing electrical signals to the electronics module indicative of said pressure fluctuation.

According to another embodiment a force feedback device is provided for use with a prodder for probing the ground for buried objects, said prodder including a rod having a driving end and a sensing end for placing in contact with an object, a transducer coupled to the driving end for converting electrical signals into mechanical vibrations for being transmitted through the rod from the driving end to the object and for converting mechanical vibrations reflected from the object into electrical signals related to the material characteristics of the object and a force with which the rod is applied to the object, and an electronics module for processing the electrical signals related to the material characteristics of the object and the force with which the rod is applied to the object, said force feedback device comprising:

a body having a cavity, a sealed end, and an open end;

a diaphragm secured to the open end for retaining a fluid within the cavity and for sustaining deflections in dependence upon a pressure fluctuation of a fluid external the cavity; and, sensing means coupled to the diaphragm for measuring the deflections and for providing electrical signals to the electronics module indicative of said pressure fluctuation, the pressure fluctuation in dependence upon the force with which the rod is applied to the object.

BRIEF DESCRIPTION OF THE DRAWINGS

Exemplary embodiments of the invention will now be described in conjunction with the drawings, in which.

DETAILED DESCRIPTION

Figure 1:
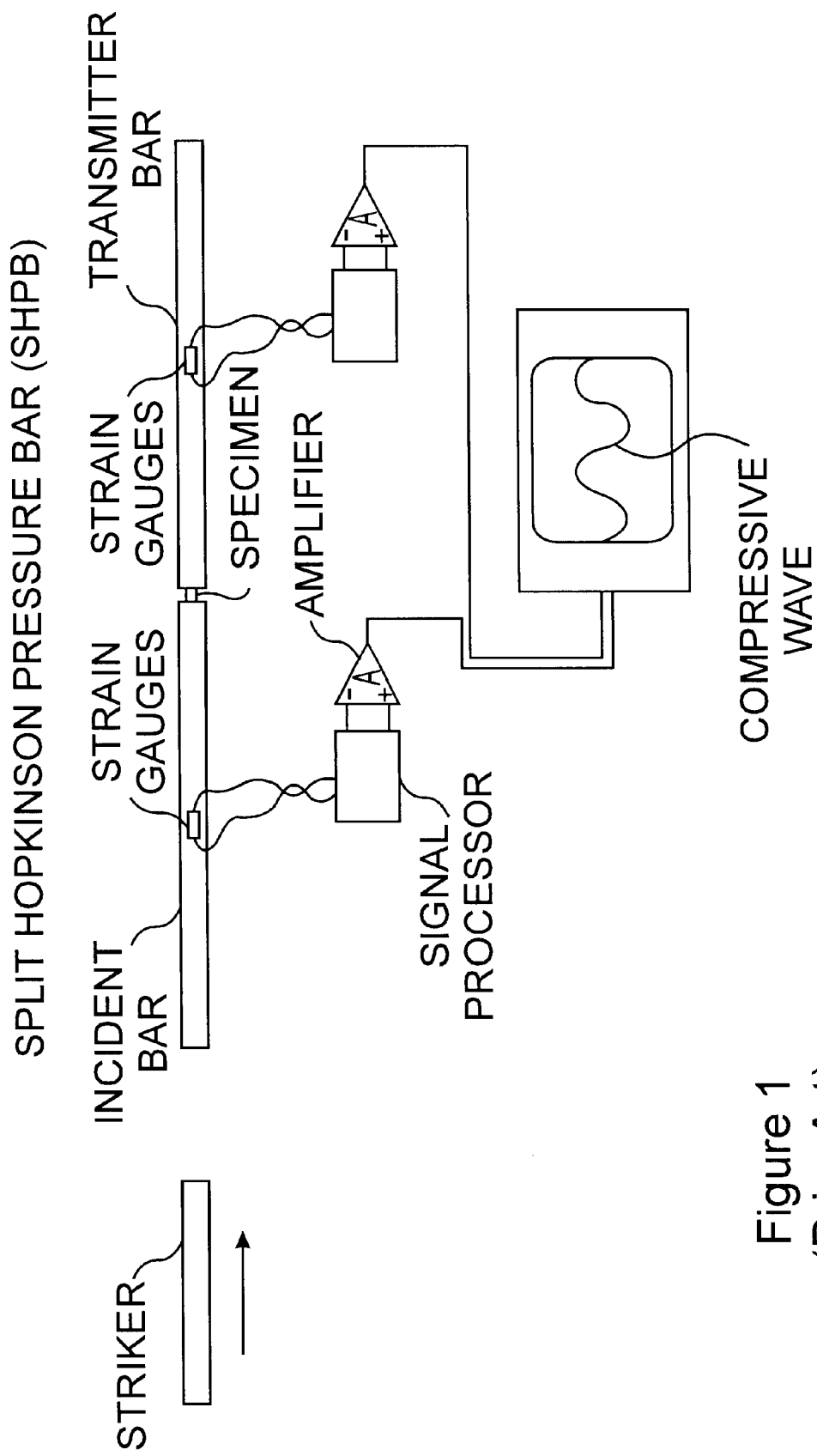
FIG. 1 is a prior art circuit diagram of a Split Hopkinson Pressure Bar device.

In prior art FIG. 1 a specimen sample is shown juxtaposed between an incident bar and a transmitter bar. A strain gauge disposed on each bar provides a signal to signal processor as is described heretofore.

Figure 2:
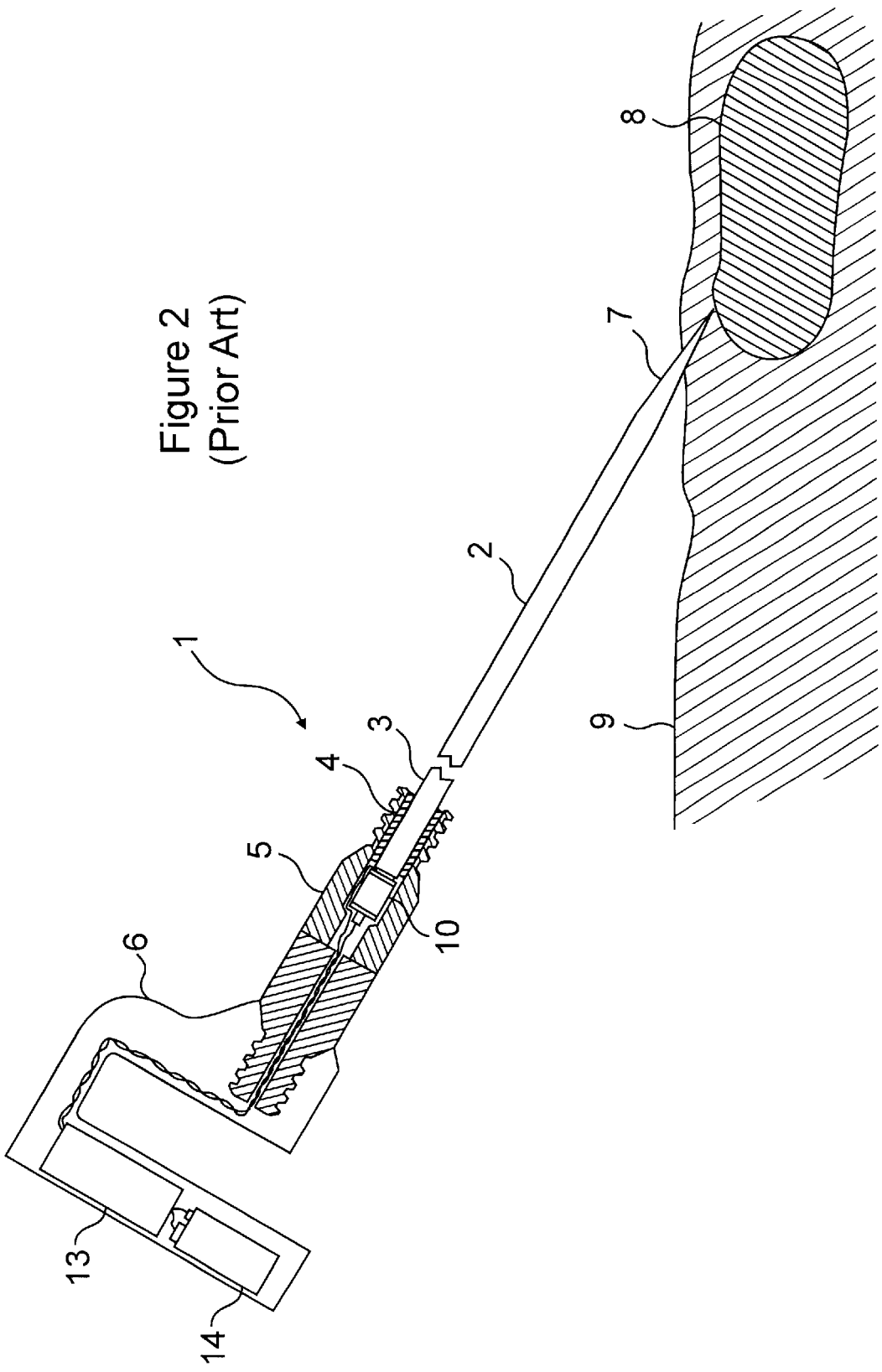
FIG. 2 is a prior art cross-sectional view of a hand prodder contacting a sub-surface object.

In prior art FIG. 2 a hand-held prodder for probing the ground for buried explosive devices such as landmines and the like is provided. The prodder comprises a rod 2 having a first end 3 flexibly supported by an annular rubber coupling 4 in a mounting nub 5. The nub 5 is screwed into a handle 6. The rod has a pointed second end 7 for sensing objects 8 buried in the ground 9.

The rod 2 is 45 cm long and is formed of non-magnetic, austenitic stainless steel. Only 30 cm project from the rubber coupling 4. The rubber coupling 4 lessens the rigidity between the rod 2 and handle 6.

Figure 3:
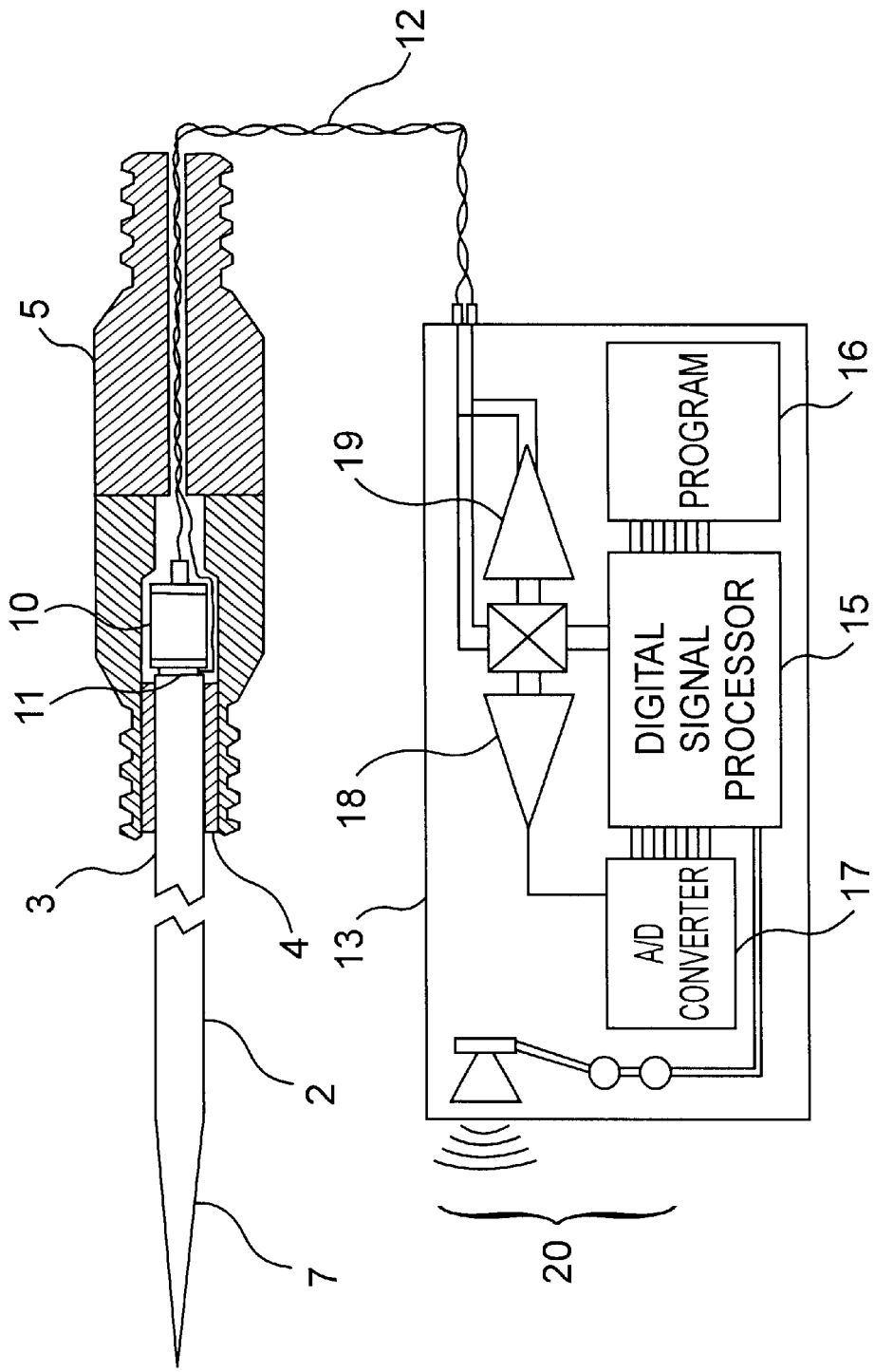
FIG. 3 is a prior art cross-sectional view of the rod and piezoelectric crystal portion of the prodder coupled to the signal processing module.

Best seen in prior art FIG. 3, a piezoelectric crystal 10 is glued to the first, or driver end 3 of the rod 2. When an electric field is applied to the crystal 10, a mechanical strain will occur and drive mechanical energy into the rod's driver end 3. Conversely, when the crystal 10 is mechanically stressed, an electric charge is produced. A suitable crystal is a 15 mm long, 6.35 mm diameter poly-crystalline ceramic cylinder, model Sonex P-41 available from Hoechst CeramTec, Mansfield, Mass. The crystal 10 is electrically insulated from the rod 2 with a ceramic insulator 11.

Positive and negative electrical leads 12 from the crystal pass through the nub 5 for bi-directional electrical signal transmission between the crystal 10 and an electronics module 13. Shown in FIG. 2, the module 13 is installed within the prodder's handle and is powered with 9 V batteries 14.

The electronics module 13 is capable of two modes: a driver mode and a signal processing mode. In the driver mode, an electrical signal is transmitted along leads 12 to the crystal 10 for generating a piezoelectric mechanical pulse. The pulse is introduced into the rod's driver end 3. In the signal processing mode, any electrical signals generated by the crystal 10 are transmitted along leads 3 for processing by the electronics module 13.

More specifically, the module 13 comprises a digital signal processing microcomputer 15, an EPROM 16 containing program instructions and digital storage means, an A/D converter 17, a signal input amplifier 18 and a driver output amplifier 19. An audio/visual binary output device 20 is provided.

A suitable signal processor is a model ADSP-2181 digital signal processing microcomputer by Analog Devices, Inc., Norwood, Mass. The ADSP-2181 contains a high speed serial port, 16 bit data processing capabilities and has both onboard program RAM and data memory RAM. For permitting battery powered operation, the ADSP-2181 features a power saving "sleep" mode. After downloading of program instructions from the EPROM, the ADSP-2181 will reduce its power consumption and await a suitable trigger before "waking-up" to begin signal processing.

Figure 4:
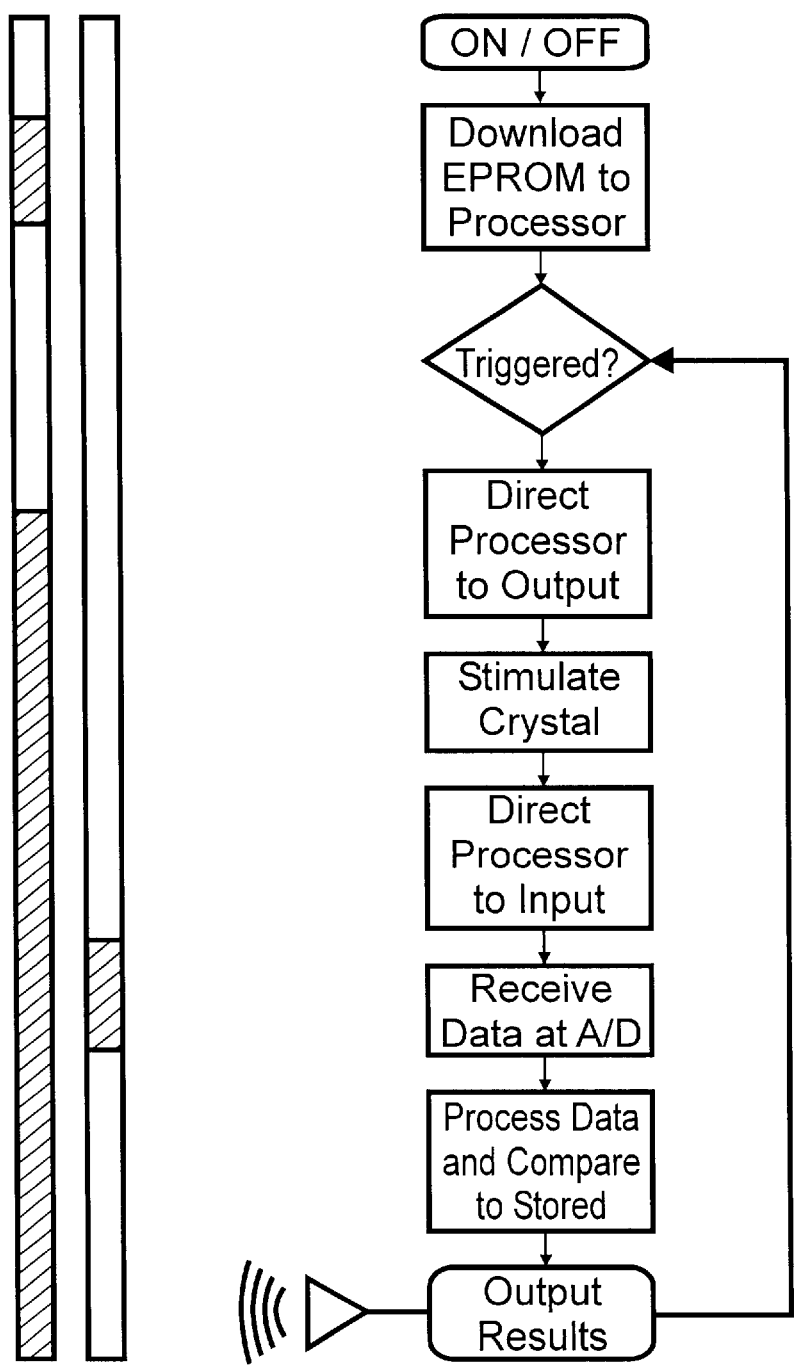
FIG. 4 is a prior art flow chart of the digital signal processor and A/D functions.

Having reference to the prior art flow chart in FIG. 4, when the prodder is activated, the EPROM 16 downloads the analysis program to the ADSP-2181 processor 15 and awaits a trigger. When triggered (i.e., contact of the rod's sensing end with an object) the EPROM 16 signals the driver output amplifier 19 to generate an ultrasonic analog driver signal (20–200 kHz). The driver signal stimulates the crystal 10 to generate a mechanical pulse and send it as an acoustic incident wave down the longitudinal axis of the rod 2. The incident wave reflects from the object 8 at the rod's sensing end 7 and returns to the rod's driver end 3 as a reflected wave. The mechanical energy in the reflected wave stimulates the crystal 10 to generate electrical analog signals characteristic of the reflected wave.

The analog signals are processed through the signal input amplifier 18 and converted by the A/D converter 17 for analysis by the signal processor 15. A suitable A/D converter is available as model AD876 10 bit, 20 MSPS (million samples per second) CMOS converter, also from Analog Devices, Inc. The AD876 is also capable of a "sleep" mode.

The digital processor 15 stores the reflected data in its RAM memory. The characteristics of the reflected signal are dependent upon the material characteristics of the object 8. Different materials have different MI and frequency-dependent damping coefficients. Analysis of the reflections and damping rates demonstrated in the reflected data is instructive of the material characteristics of the object.

Accordingly, using one analytical technique, the stored data is conditioned using a stepping FFT and analysed for frequency-time-amplitude information. A 256 point FFT from a 1024 sample is advanced in 128 sample steps which yields 7 time-slices of FF transformed data. The characteristics distinctive of the material are generally located within the first 5–10 harmonics or bins of the transformed data.

The effects of the peculiar characteristics of the rod are calibrated by causing the piezoelectric crystal to send a pulse along the rod when its sensing end is not contacting anything. This "dryfire" provides a baseline reading which accounts for individual characteristics including the tapered point of the bar, wear, temperature, and accumulated debris. This resulting baseline power data is subtracted from the actual contact data.

Non-contact calibration can be done before each use to account for physical prodder variations. The extraction of the baseline rod characteristics heightens the sensitivity of the signal analysis, having removed a portion of the signal, which is not attributable to the object.

However, non-contact calibration does not account for variations in pressure with which the sensing end 7 of the rod is forced against the object 8 to be detected. In fact, there is no attempt to calibrate the prodder with respect to effects from an applied force, such as pressure. This is a significant limitation to the prodder described heretofore and shown in the figures. Since readings acquired with the prodder are dependent upon applied pressure, and since the applied pressure is likely different each time the prodder is used, it is desirable to provide means for providing force feedback to compensate the readings for an applied force. Providing force feedback to the prodder and/or the user of the prodder also allows the applied force to be determined to calculate whether too little or too much force is applied to the object being detected. Preferably, the means for providing force feedback does not reduce the durability of the prodder and/or significantly increase the manufacturing cost.

Figure 5:
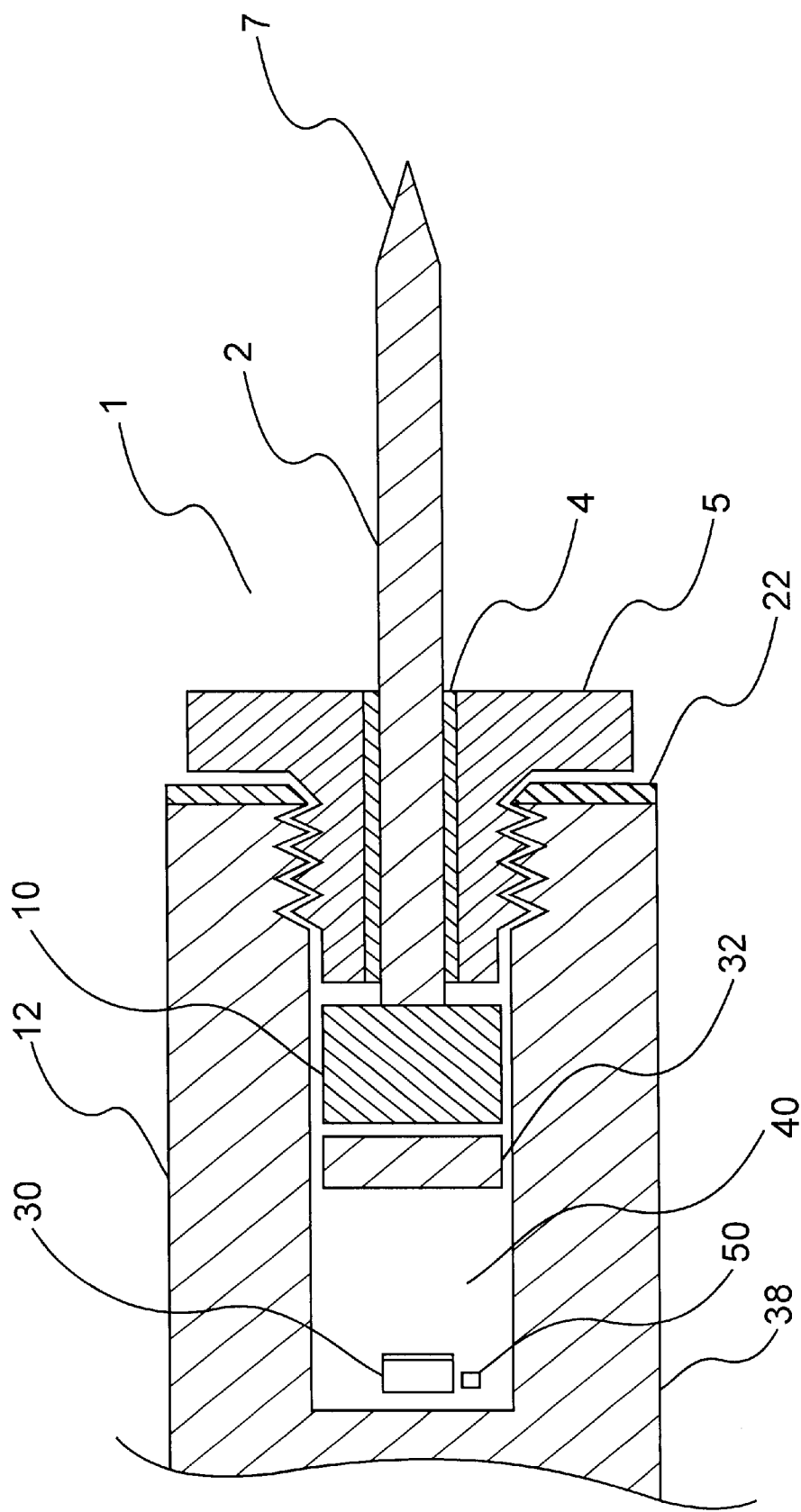
FIG. 5 is a cross-sectional view of the rod, piezoelectric crystal, and force feedback portion of the prodder, according to one embodiment of the invention.

Referring now to FIG. 5, an embodiment of a prodder having force feedback is shown. The device and method for providing force feedback are comparable to the device and method described heretofore. The prodder includes a probing rod 2, a housing 12 for receiving a non-probing end of the rod 2, and a threaded lock fitting screw 5 having a bore extending through its shaft for slidably receiving the rod 2 and for securing the rod 2 within the housing 12. A spacer in the form of a compressible washer 22 is disposed between an inside face of a flange of the threaded probe mount 5 and an outside face of the housing 12. Compression fitting 4 electrically insulates the non-prodding end of the rod, which is coupled to the transducer 10.

The 'force sensing' section of the prodder 1 includes a pressure sensor 30 for sensing the pressure of a fluid contained within a cavity 40 of the prodder 1, and for converting data corresponding to the pressure of this fluid to electronic signals indicative thereof. The force sensor is fluidly coupled to the probe portion of the prodder. Optionally, an acoustic insulator 32 is provided for shielding the force sensor 30 from the acoustic vibrations emitted from the transducer 10. Further optionally, a temperature sensor 50 is provided within the cavity 40, preferably proximate the pressure sensor 30. An electronics module 13 is disposed in the prodder, for example in the prodders' handle 6, for controlling the ultrasonic transducer and analysing signals acquired therefrom, for analysing signals from the pressure sensor 30 indicative of the pressure of the fluid accommodated in the cavity 40, for determining the force applied to the object 8 from the rod 2, and for determining material characteristics of the object 8 independent of the force applied to the object 8.

Figure 6:
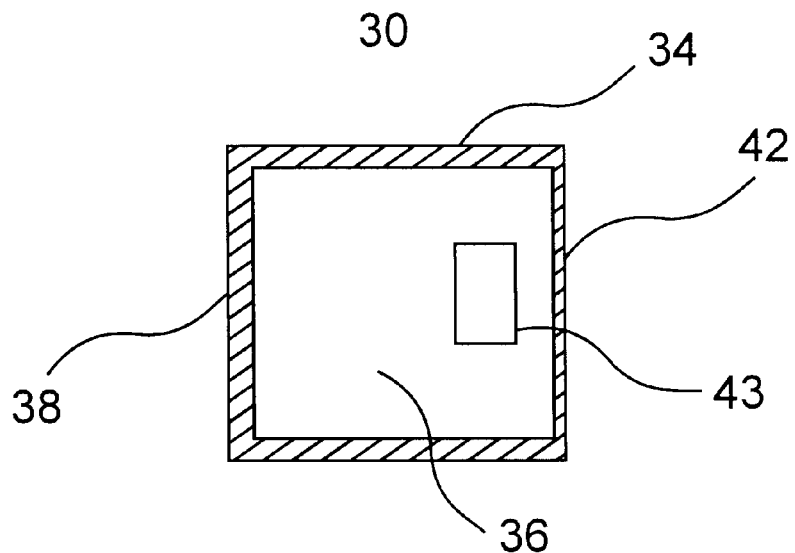
FIG. 6 is a cross-sectional view of the force sensor.

In the preferred embodiment, illustrated in FIG. 6, the force sensor 30 is an acoustic transducer, such as a microphone, adapted for good low frequency response. The foundation of the microphone 30 is a body 34 having a cavity 36, a sealed end 38, and an open end. A deflectable diaphragm 32 is secured to the open end for sealing a fluid within the cavity 36, and for sustaining deflections in dependence upon the characteristics of the fluids internal and external the cavity. Sensing means 43 for monitoring the deflections, which arise from pressure fluctuations on either side of the diaphragm, and for providing electrical signals to the electronics module indicative thereof, are provided. For example, the sensing means 43 are similar in design to those use conventional condenser type microphones, or alternatively, are based on those used in electret microphones. Optionally, the design of the microphone incorporates a pressure equalization 'slot' as is known in the prior art.

Figure 6A:
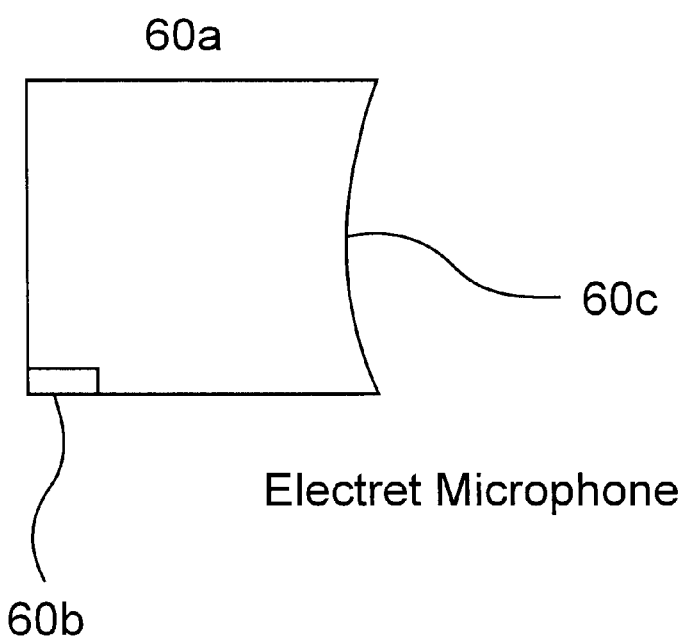
FIG. 6a is a simplified view of an electret microphone for use as the force sensor.

Referring to FIG. 6a a simplified diagram of an electret microphone is shown. The microphone has a housing 60a having a pressure equalisation opening 60b which, according to the invention is sealed, and a membrane 60c responsive to pressure.

In operation, the prodder 1 in accordance with the invention, works in the following manner: The prodder rod 2 is inserted into the ground 9 until it comes into contact with an object 8. The force exerted by the user to push the rod 2 into contact with the object is met with an approximately equal but opposite force of the rock 8 on the rod's sensing end 7, provided the rock 8 does not substantially move.

As the prodder 1 comes into contact with the object, the electronics module 13 induces the transducer 10 to launch an ultrasonic pulse towards the prodding end 7 end of the rod. This ultrasonic pulse travels through the rod 2 to the unknown object 8 in contact with the sensing end 7 of the rod and is reflected back to the transducer 10, where it is converted to electrical signals indicative of rod 2 and the environment about rod 2. For example, the electrical signals are typically related to both the material characteristics of the unknown objects being detected and the force applied to the probing end of the rod 7. The electronics module 13 provides means for processing, storing, and analysing the reflected data from the transducer 10, as described above.

Simultaneous to the electronics module 13 energizing the transducer 10, the force sensor 30 is actuated for initiating the acquisition of a reading corresponding to the pressure of the fluid accommodated in the cavity 40. For example, as a force is exerted on the sensing end 7 of the rod in a direction parallel to the longitudinal axis of the rod 2, the driving end 3 exerts an equivalent force on the transducer 10, which is conveniently expressed as an acceleration of the transducer 10 provided the transducer is able to experience a degree of translational motion in the direction parallel to the longitudinal axis of the rod 2. The displacement of the transducer 10 changes the pressure of the fluid accommodated in the cavity 40 adjacent the transducer 10. In other words, a predetermined volume of air at a predetermined pressure, for example atmospheric pressure, is compressed to an extent that the pressure substantially increases. The pressure sensor 30 provides means to measure the increase in pressure for providing an indication of the force applied to the sensing end 7 of the rod.

The time period for maintaining the increase in pressure is dependent upon the extent to which the cavity 40 is sealed and the elastic properties of the prodder components. Obviously, a hermetically sealed cavity 40 will experience the greatest changes in pressure and will provide the strongest signals related to small changes in pressure.

Once the increased pressure has been measured, it is used to compensate the data corresponding to the reflected waves traveling to the transducer 10, which is used to categorise broadly the unknown object as plastic, rock or metal. The user is presented with a visual indication, preferably in the form of a light pattern indicating the type of obstruction.

Figures 7, 8:
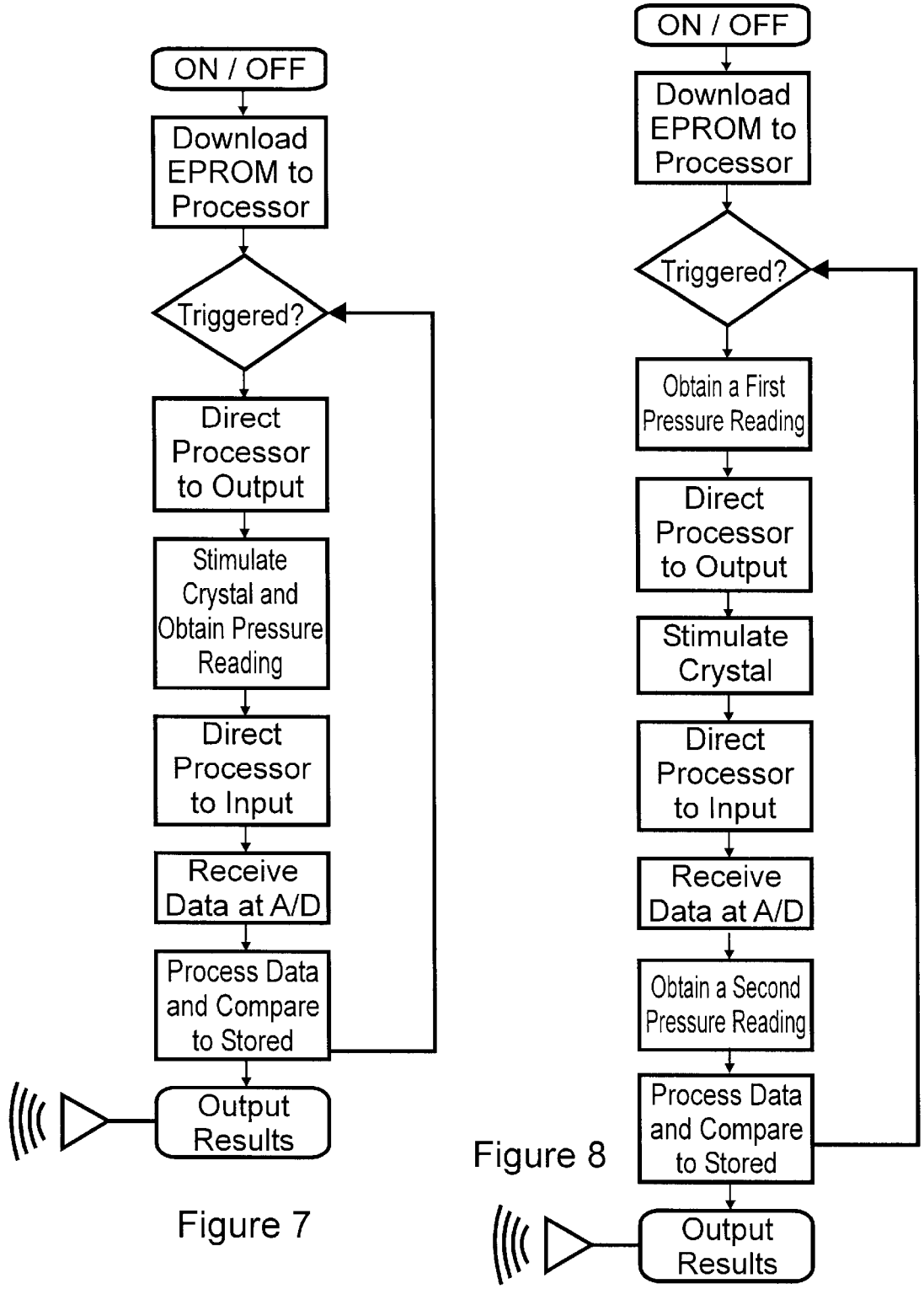
FIG. 7 is a flow chart of the digital signal processor and A/D functions according to one embodiment of the invention.
FIG. 8 is a flow chart of the digital signal processor and A/D functions according to another embodiment of the invention; and, FIG. 9 is a cross-sectional view of the rod, piezoelectric crystal, and force feedback portion of the prodder, according to another embodiment of the invention.

This method of determining the characteristics of and classifying the unknown object is more accurate than methods not accounting for variations in applied force. FIG. 7 illustrates the process described heretofore.

In another embodiment, shown in FIG. 8, a first pressure reading is acquired before the piezoelectric crystal 10 is stimulated, and a second pressure reading is acquired after the reflected waves are received at the crystal 10. This embodiment is useful when a variable force is applied to the rod 2 during acoustic sampling. Specifically, the first and second readings are averaged to provide an average pressure reading for the duration of the acoustic reading. An additional advantage is that the acoustic signals from the transducer 10 and/or the rod 2 do not interfere with the pressure readings, since the first and second pressure readings are acquired therebefore and thereafter, respectively. As a result, is not necessary for the acoustic insulator 32 to shield the pressure sensor 30 from potentially interfering pressure variations arising from the acoustic transmissions, as is desirable for the previous embodiment.

In either embodiment, the acquired and/or average pressure reading corresponds to a pressure difference or an absolute pressure. In general, the pressure difference corresponds to the difference in pressure of the cavity 40 before and after the rod comes into contact with the rod. Alternatively, the difference corresponds to the difference in pressure of the cavity 40 and the external environment.

If the absolute pressure is measured, it is desirable to standardize and/or calibrate the force sensor to account for environmental variations. One way to account for environmental variations is to calibrate the prodder before each use. For example, by producing a "dryfire" as described in the prior art, wherein the effects of the changing environment and the peculiar characteristics of the prodder are easily accounted for, including the environmental temperature and pressure, and the shape, length, and condition of the rod 2. The resulting baseline data is subtracted from the contact data to obtain the desired results.

Another way to regulate the prodder is to ensure that the cavity 40 surrounding the pressure sensor is hermetically sealed. The sealed cavity 40 accommodates a predetermined amount of a gas. The temperature is measured with the temperature sensor 50 to provide an estimate of pressure within the cavity 40 that is calibrated for variations in the external temperature.

In a third instance, the effects of external temperature are accounted for by ensuring that the volume of air in the cavity 36 of the microphone is approximately the same as the volume of air in the cavity 40 adjacent the transducer 10. In this embodiment shown in FIG. 9, the cavity 40 is proximate the acoustic insulator 32, or in absence of an acoustic insulator 32 is proximate the transducer 10. The change in pressure is effected by the direct pressure of the acoustic insulator 32 on the body defining cavity 40, wherein at least a portion of the body is substantially pliant to accommodate the applied pressure. Alternatively, body 40 is rigid and the change in pressure is effected with translational motion of a plunger 60, FIG. 9*a*. The pliant wall 44 and/or the plunger 60 provide means for changing the air pressure of the relativity air-tight region within the prodder.

As previously stated, once the increase in pressure has been measured, it is used to compensate the data corresponding to the reflected waves traveling to the transducer 10. In addition to providing means for compensating the reflected data for variations in applied force, the magnitude of the applied force optionally provides the user with information regarding the pressure they are applying to the unknown object. The latter is of particular importance when the user needs to apply a force that is high enough to provide a reliable reading, but not high enough to accidentally detonate a landmine. For example, a signal indicative of the applied force is used to sound an alarm when too much or too little force is applied. Alternatively, the intensity of the alarm increases and/or decreases, dependent upon the amount of force applied. Further alternatively, a visual indication of the applied force is provided, i.e., in the form of a plurality of LEDs or similar indicators.

As described in the prior art, the rod is preferably formed from a non-magnetic, austenitic stainless steel and the transducer is an appropriate piezoelectric crystal. The acoustic insulator 32 is constructed preferably of a material, such as an appropriate rubber, that shields the force sensor 30 from the acoustic waves originating from transducer 10.

In order for the acoustic waves to be transmitted without distortion, the coupling between components, such as the transducer and the rod, must be free of imperfections such as interruptions (air pockets) or resonance impeding contacts (such as screws or welds) that dampen the transmission. There are various means, such as an appropriate adhesive and/or a dual-sided cup, of securing the rod 2 to the transducer 10.

Figure 9:
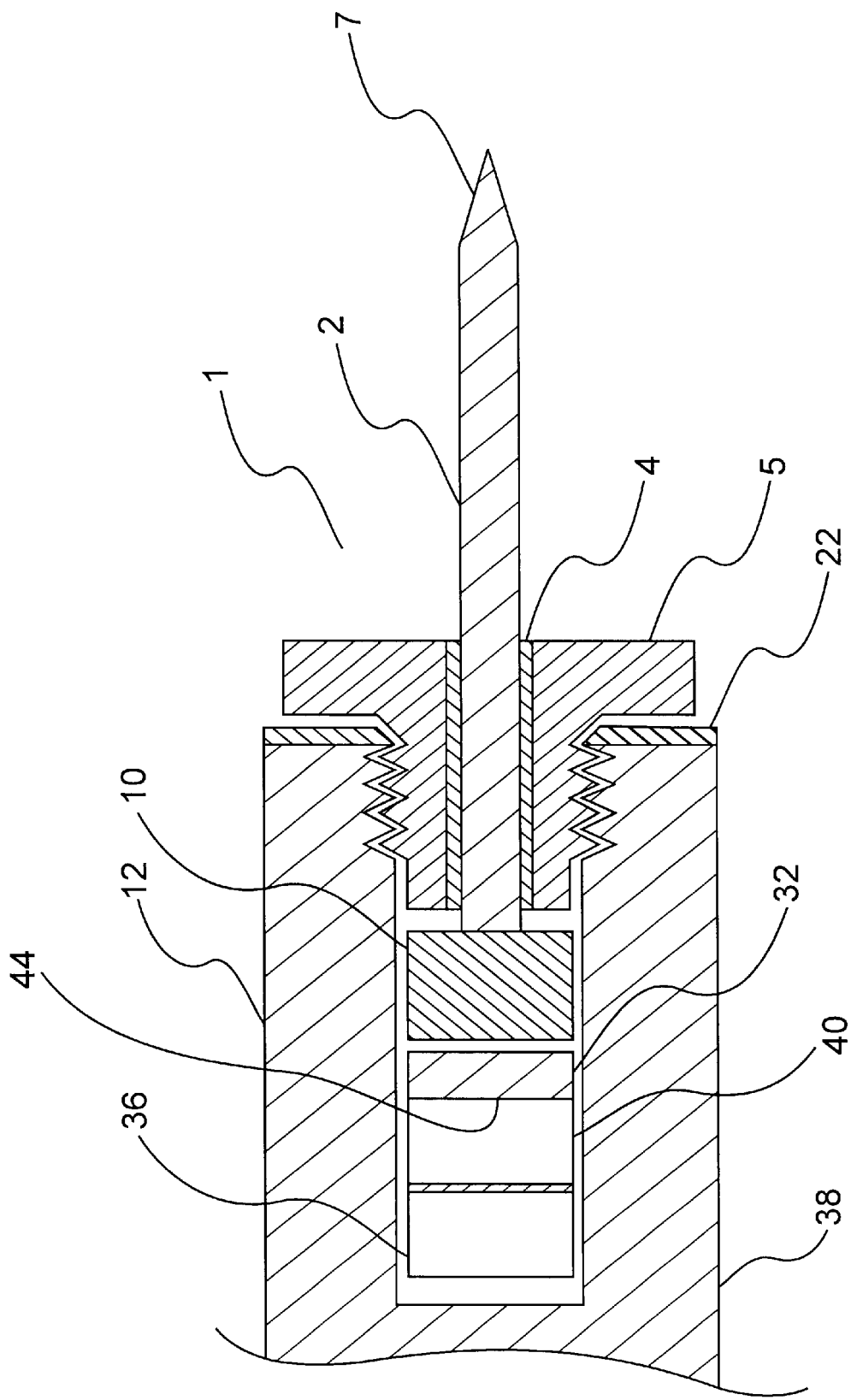
FIG. 9a is a cross-sectional view of the rod, piezoelectric crystal, and force feedback portion of the prodder with plunger, according to another embodiment of the invention.
Figure 9A:
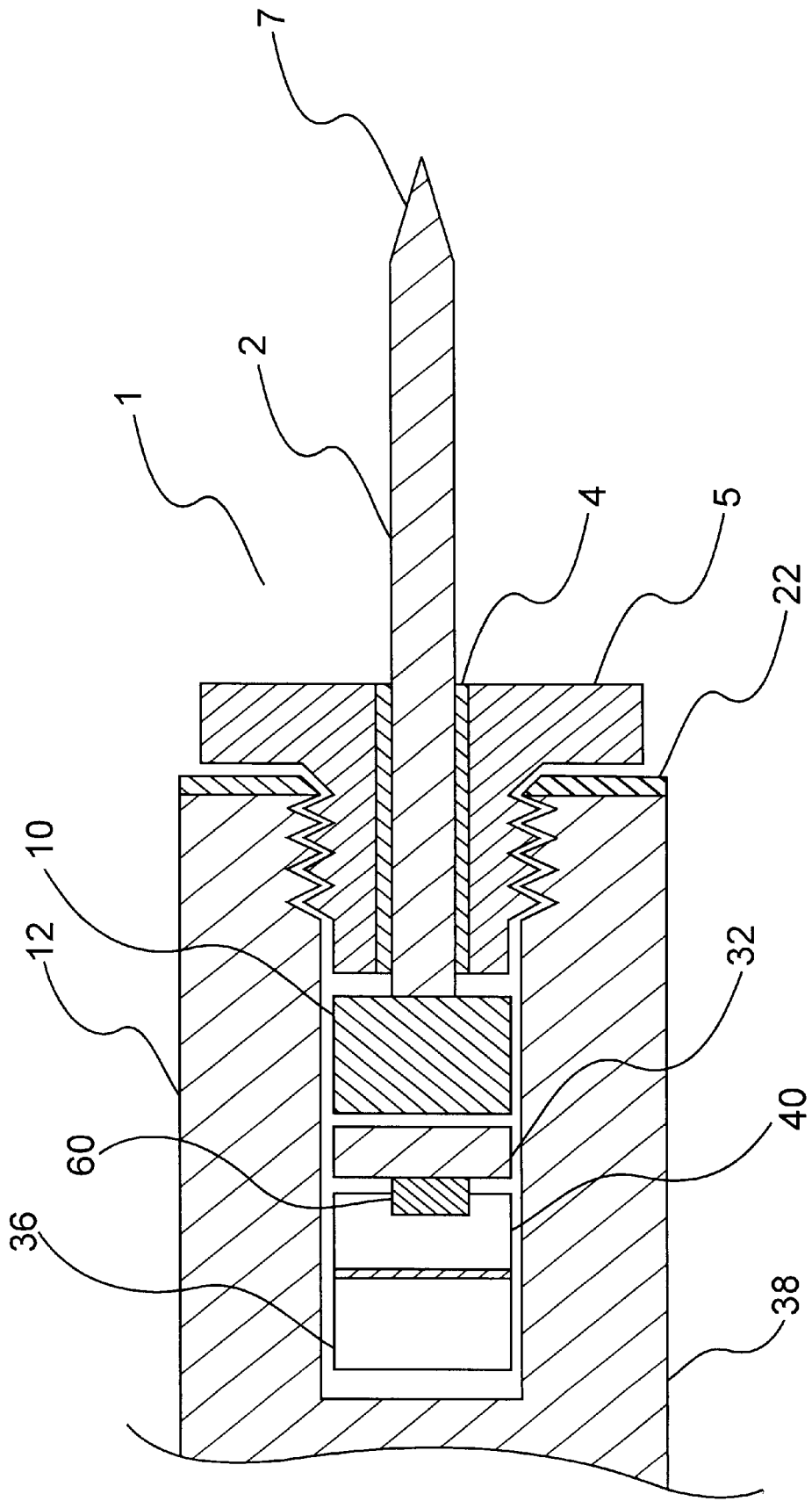

In the embodiment shown in FIG. 9, the acoustic insulator 32 optionally serves as a barrier between the transducer 10 and the force sensor 30 within a pliant, yet stable, sleeve (not shown). The sleeve protects and secures the prodder components, i.e., the rod 2, the transducer 10, and the force sensor 30.

There are many advantages of the device as described heretofore, as compared to other devices with force feedback. One of the most significant advantages is the low cost of the device. The limited number of parts makes the device very simple and economical to manufacture. The fact that the force sensing components are disposed within the prodder, makes the prodder more rugged, durable, and compact.

The force sensor of the present invention provides an accurate means of determining the pressure of the fluid within the cavity near the transducer, for determining the force with which the rod is forced against an unknown object, for subsequent compensation of the reflected data.

The fact that it is not necessary for the force sensor to contact the transducer, or proximate components such as an acoustic coupler, means that there is no additional alignment, thus reducing manufacturing costs. Moreover, since the force sensor does not directly experience the force with which the rod is placed against the object, it does not experience the same sort of material fatigue as a spring based force sensor in direct contact with the transducer/acoustic coupler. Furthermore, since the force sensor is not in direct contact with the transducer, there is less risk of it interfering with the reflected waves—thus allowing more accurate data to be acquired.

Of course, numerous other embodiments may be envisaged, without departing from the spirit and scope of the invention.

What is claimed is:

1. A prodder with force feedback for sensing an object buried beneath the ground, comprising:
    a probe including a rod having a prodding end for prodding the object and a transducer coupled to a non-prodding end of the rod for providing an acoustic wave to the object and for receiving acoustic waves reflected from the object;
    a housing including a first cavity containing a fluid and for supporting the probe such that the volume of the fluid within the first cavity is affected by pressure applied to the prodding end of the rod;
    a force sensor fluidly coupled to the first cavity for determining a change in pressure of a fluid within the first cavity; and,
    an electronics module for processing data related to the reflected waves, for processing data related the change in pressure of the fluid, and for providing data for comparing the processed data against stored values representative of the acoustic characteristics of known materials so as to categorize the object's material.

2. A prodder as defined in claim 1, wherein the force sensor comprises:
    a body having a cavity, a sealed end, and an open end;
    a diaphragm secured to the open end for retaining a fluid within the cavity and for sustaining deflections in dependence upon a pressure fluctuation of a fluid external the cavity; and,
    a sensor for providing electrical signals to the electronics module in dependence upon the deflections of the diaphragm.

3. A prodder as defined in claim 2, wherein the first cavity is hermetically sealed within a predetermined region of the prodder.

4. A prodder as defined in claim 3, further comprising a temperature sensor for detecting the temperature of the fluid within the first cavity.

5. A prodder as defined in claim 3, wherein the volume of the fluid within the first cavity is substantially the same as the volume of the cavity of the force sensor.

6. A land mine detector having force feedback comprising:
    a probe including a rod having a driving end and a sensing end for prodding an object buried beneath the ground, the driving end coupled to a transducer for imparting mechanical energy into the rod towards the sensing end in contact with the object and for detecting an electrical signal corresponding to reflected waves reflected from the object;

a housing including a first cavity containing a fluid and for supporting the probe such that the volume of the fluid within the first cavity is affected by pressure applied to the prodding end of the rod;

a force sensor fluidly coupled to the first cavity for determining a change in pressure of a fluid within the first cavity and for providing an electrical signal indicative thereof; and, an electronics module for processing the electrical signals, for determining the force exerted on the rod, and for determining force-independent material characteristics of the buried object for comparing with stored material characteristics of known objects so as to categorize the object's material.

7. A land mine detector as defined in claim 6, wherein the force sensor comprises:

a body having a cavity, a sealed end, and an open end;

a diaphragm secured to the open end for retaining a fluid within the cavity and for sustaining deflections in dependence upon a pressure fluctuation of a fluid external the cavity; and, a sensor for measuring the deflections of the diaphragm and for providing electrical signals to the electronics module indicative of said pressure fluctuation.

8. A land mine detector as defined in claim 7, wherein the force sensor is hermetically sealed within a predetermined region of the land mine detector.

9. A land mine detector as defined in claim 8, further comprising a temperature sensor disposed within the predetermined region.

10. A land mine detector as defined in claim 8, wherein the volume of the predetermined region is substantially the same as the volume of the cavity of the force sensor.

11. A land mine detector as defined in claim 10, wherein the probe comprises an acoustic insulator proximate the transducer.

12. A land mine detector as defined in claim 11, wherein means for changing the pressure of the fluid includes means for forcing at least a portion of the probe against a pliable surface of the predetermined region, the pliable surface movable in response to the force exerted on the rod.

13. A land mine detector as defined in claim 11, wherein the means for changing the pressure of the fluid including forcing a plunger into a portion of the cavity, the plunger movable in response to the force extended on the rod.

14. A force feedback device for use with a prodder for probing the ground for buried objects, said prodder including a rod having a driving end and a sensing end for placing in contact with an object, a transducer coupled to the driving end for converting electrical signals into mechanical vibrations for being transmitted through the rod from the driving end to the object and for converting mechanical vibrations reflected from the object into electrical signals related to the material characteristics of the object and a force with which the rod is applied to the object, and an electronics module for processing the electrical signals related to the material characteristics of the object and the force with which the rod is applied to the object, said force feedback device comprising:

a body having a cavity, a sealed end, and an open end;

a diaphragm secured to the open end for retaining a fluid within the cavity and for sustaining deflections in dependence upon a pressure fluctuation of a fluid external the cavity; and, a sensor for measuring the deflections of the diaphragm and for providing electrical signals to the electronics module indicative of said pressure fluctuation, the pressure fluctuation in dependence upon the force with which the rod is applied to the object.

15. A force feedback device as defined in claim 14, wherein the sensor is for measuring a capacitance.

16. A force feedback device as defined in claim 15, wherein the device is an electret microphone.

* * * * *

UNITED STATES PATENT AND TRADEMARK OFFICE
CERTIFICATE OF CORRECTION

PATENT NO. : 6,386,036 B1
DATED : May 14, 2002
INVENTOR(S) : Borza

It is certified that error appears in the above-identified patent and that said Letters Patent is hereby corrected as shown below:

Column 7,
Line 22, the numeral reference "32" should read -- 42 --;
Line 30, the word "use" should read -- used in --.

Column 12,
Line 5, the word "including" should read -- includes --;
Line 7, the word "extended" should read -- exerted --.

Signed and Sealed this

Fourth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,386,036 B1
DATED        : May 14, 2002
INVENTOR(S)  : Borza

It is certified that error appears in the above-identified patent and that said Letters Patent is hereby corrected as shown below:

<u>Column 7,</u>
Line 22, the numeral reference "32" should read -- 42 --;
Line 30, the word "use" should read -- used in --.

<u>Column 12,</u>
Line 5, the word "including" should read -- includes --;
Line 7, the word "extended" should read -- exerted --.

This certificate supersedes Certificate of Correction issued on February 4, 2003 (see Official Gazettes listing of Certificate of Correction issued on February 4, 2003), since the certificate reflects the incorrect "Signed and Sealed" date of January 4, 2003.

Signed and Sealed this

Thirtieth Day of March, 2004

JON W. DUDAS
*Acting Director of the United States Patent and Trademark Office*